US010953735B2

(12) United States Patent
Takahashi et al.

(10) Patent No.: US 10,953,735 B2
(45) Date of Patent: Mar. 23, 2021

(54) PENETRATING WIND PREVENTION STRUCTURE FOR VEHICLE

(71) Applicants: MAZDA MOTOR CORPORATION, Hiroshima (JP); Nishikawa Rubber Co., Ltd., Hiroshima (JP)

(72) Inventors: Tomoki Takahashi, Hiroshima (JP); Miwa Shinohara, Hatsukaichi (JP); Yoshihiko Horita, Higashihiroshima (JP); Tatsuo Koibuchi, Hiroshima (JP); Kazuaki Kikumitsu, Higashihiroshima (JP); Tomohiro Komaji, Higashihiroshima (JP); Sachi Matsui, Higashihiroshima (JP); Daisuke Nakazato, Hiroshima (JP); Akio Okayama, Hiroshima (JP)

(73) Assignees: MAZDA MOTOR CORPORATION, Hiroshima (JP); Nishikawa Rubber Co., Ltd., Hiroshima (JP)

( * ) Notice: Subject to any disclaimer, the term of this patent is extended or adjusted under 35 U.S.C. 154(b) by 6 days.

(21) Appl. No.: 16/327,870

(22) PCT Filed: Oct. 2, 2017

(86) PCT No.: PCT/JP2017/035868
§ 371 (c)(1),
(2) Date: Feb. 25, 2019

(87) PCT Pub. No.: WO2018/070290
PCT Pub. Date: Apr. 19, 2018

(65) Prior Publication Data
US 2019/0193539 A1 Jun. 27, 2019

(30) Foreign Application Priority Data
Oct. 14, 2016 (JP) .............................. JP2016-202194

(51) Int. Cl.
*B60J 7/22* (2006.01)
*B60J 7/11* (2006.01)

(52) U.S. Cl.
CPC ................. *B60J 7/223* (2013.01); *B60J 7/11* (2013.01); *B60J 7/22* (2013.01); *B60J 7/226* (2013.01)

(58) Field of Classification Search
CPC ............... B60J 7/22; B60J 7/223; B60J 7/226
(Continued)

(56) References Cited

U.S. PATENT DOCUMENTS 1,275,400 A * 8/1918 Crowell ............... B60G 17/033
280/159
1,631,357 A * 6/1927 Blair ....................... B61C 17/04
105/342
(Continued)

FOREIGN PATENT DOCUMENTS

DE 19810865 B4 * 8/2004 .............. B60J 7/223
JP S58-60518 U 4/1983
(Continued)

Primary Examiner — Dennis H Pedder
(74) Attorney, Agent, or Firm — Studebaker & Brackett PC

(57) ABSTRACT

In a motor vehicle having an opening 1 through an upper or lateral side of the vehicle cabin, a return portion 40c extending toward the inside of the vehicle cabin and the front of the vehicle from a region spaced rearward from the rear edge of the opening 1 is formed to return travel wind toward the front of the vehicle.

7 Claims, 14 Drawing Sheets

20··· RETRACTABLE ROOF
24··· DECK COVER
30··· STEP PORTION
40··· SEALING MEMBER
40c··· RETURN PORTION

(58) Field of Classification Search
USPC .............................................. 296/217, 180.1
See application file for complete search history.

(56) References Cited

U.S. PATENT DOCUMENTS

| | | | | |
|---|---|---|---|---|
| 2,608,926 | A * | 9/1952 | Helsley .................. | B60J 1/20 454/128 |
| 4,227,735 | A * | 10/1980 | Joyner ................... | B60R 21/12 109/9 |
| 6,666,499 | B2 * | 12/2003 | Stewart ................. | B60J 5/0497 296/203.01 |
| 7,322,626 | B2 * | 1/2008 | Thomas ................. | B60R 21/12 296/24.3 |
| 8,434,805 | B1 * | 5/2013 | Bonniville ............. | B60R 21/12 280/749 |
| 8,567,844 | B2 * | 10/2013 | Ugolini .................. | B60J 7/146 296/107.07 |
| 8,807,620 | B1 * | 8/2014 | Eilers ..................... | B60R 21/06 296/24.4 |
| 8,919,850 | B2 * | 12/2014 | Quattrocolo ............ | B60P 3/36 296/190.02 |
| 10,596,989 | B2 * | 3/2020 | Schmidt ................. | B60R 21/12 |
| 2005/0140172 | A1 | 6/2005 | Sogame et al. | |
| 2005/0280285 | A1 * | 12/2005 | Sogame .................. | B60J 7/223 296/180.1 |
| 2009/0039682 | A1 * | 2/2009 | Ito .......................... | B60J 7/192 296/216.02 |

FOREIGN PATENT DOCUMENTS

| | | |
|---|---|---|
| JP | 2001-225646 A | 8/2001 |
| JP | 2005-231613 A | 9/2005 |
| JP | 3169556 U | 8/2011 |
| JP | 2016-068609 A | 5/2016 |
| JP | 2016-107854 A | 6/2016 |

* cited by examiner

24···DECK COVER
25···LINKAGE

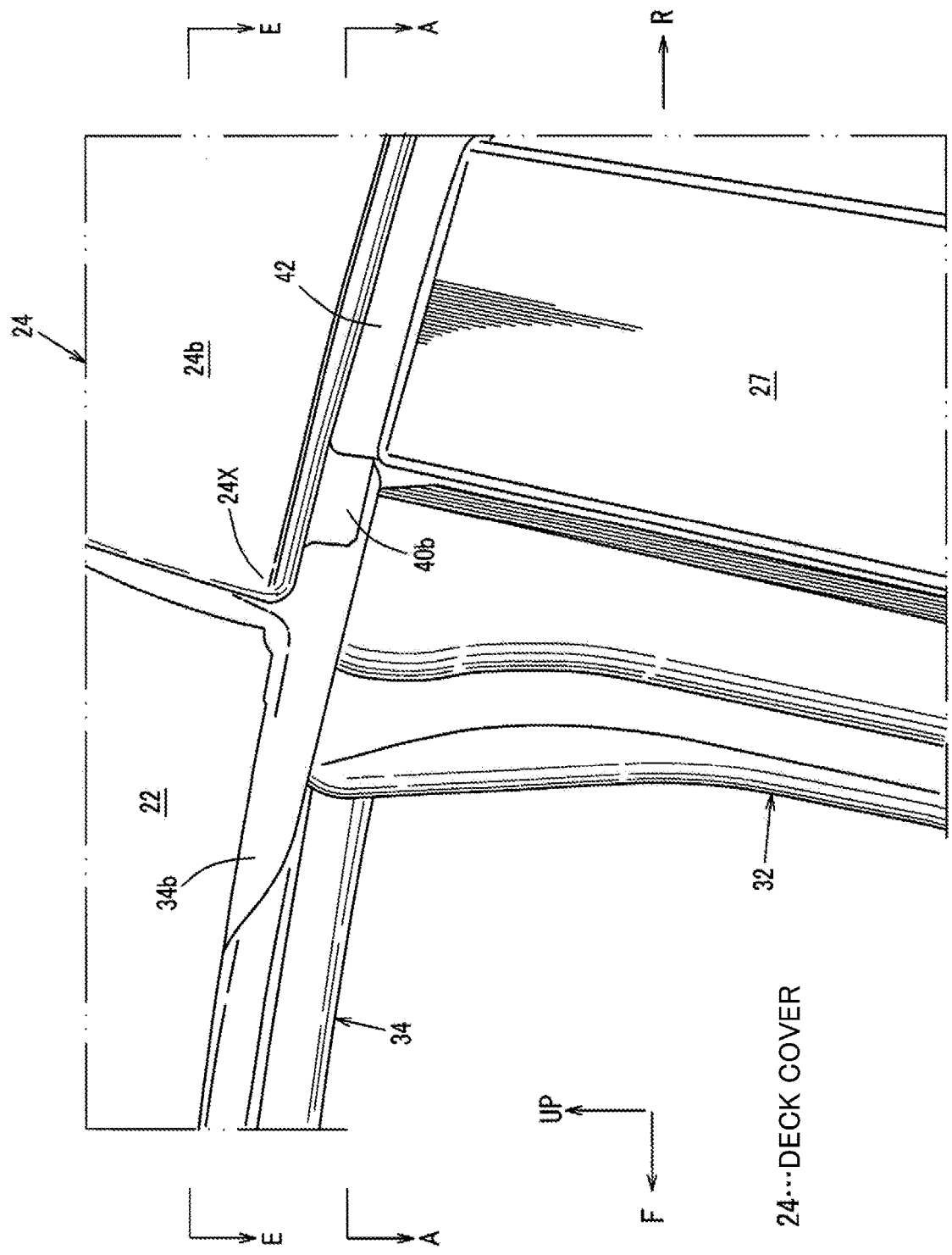

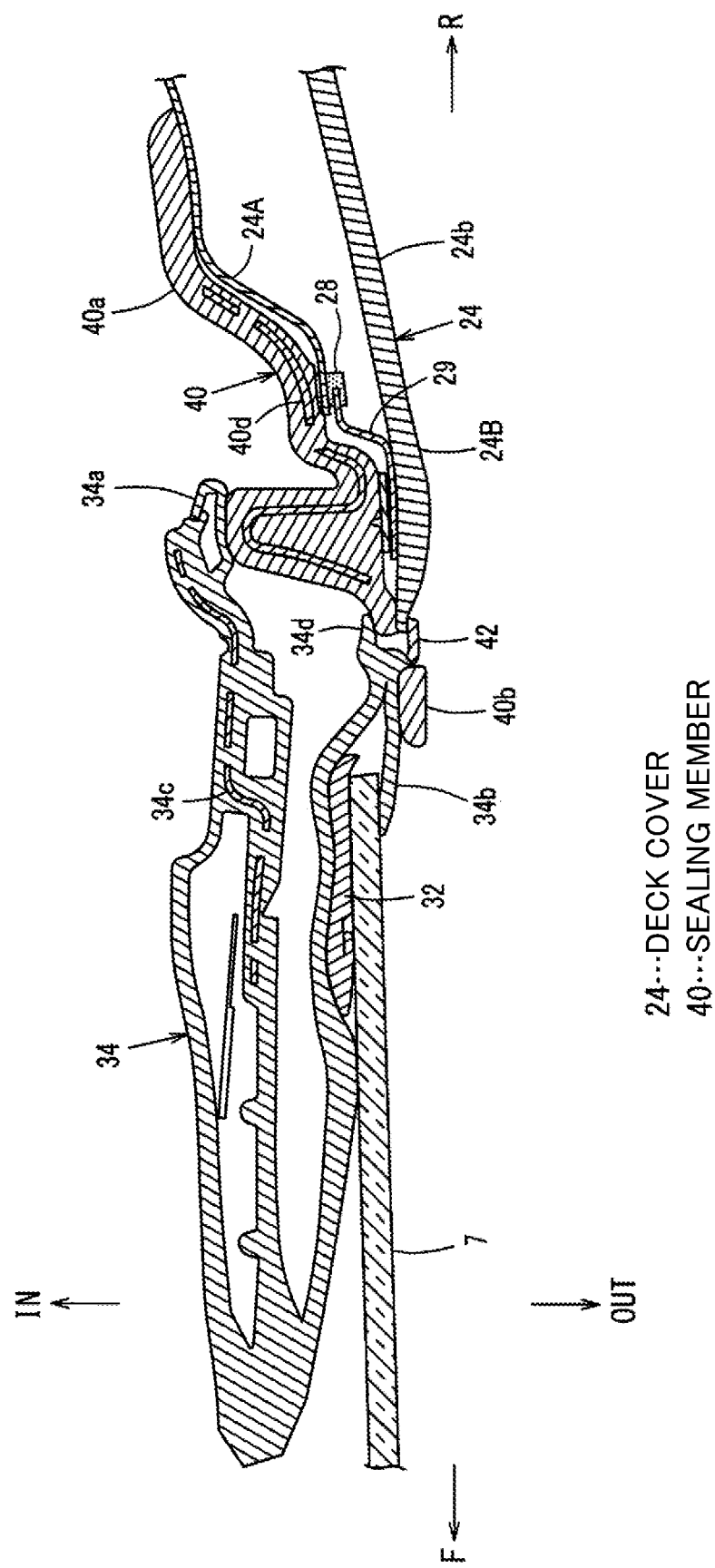

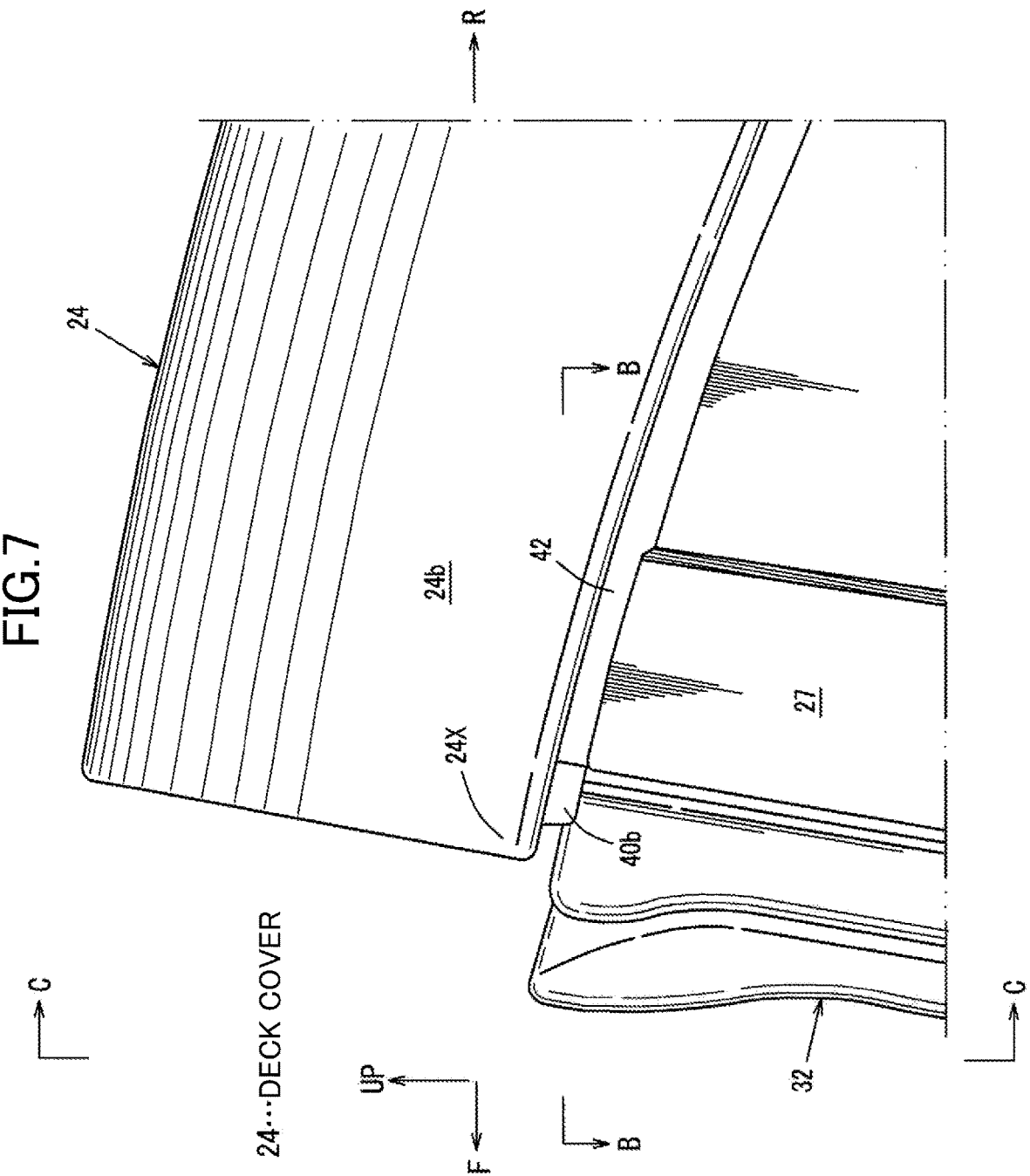

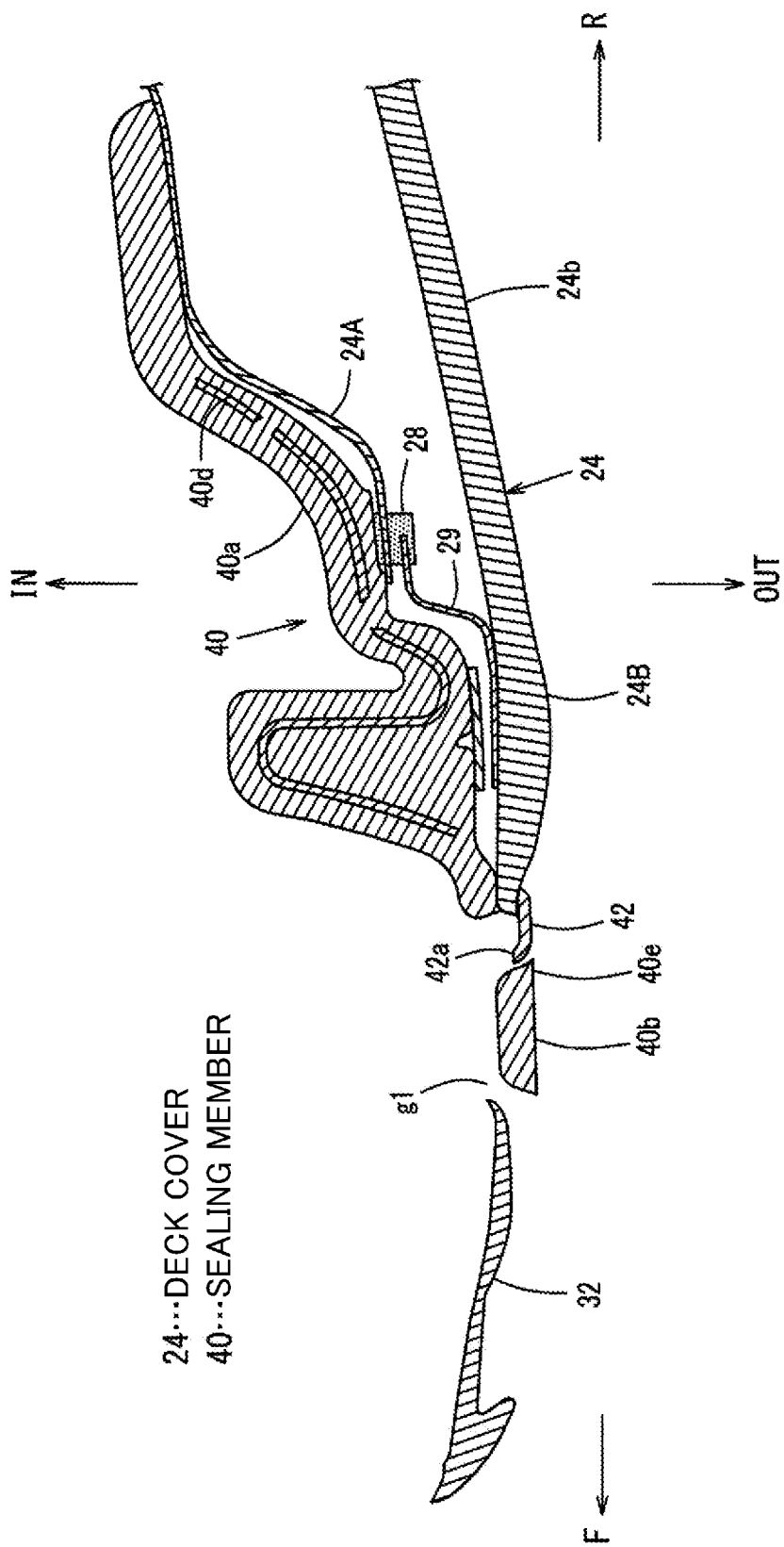

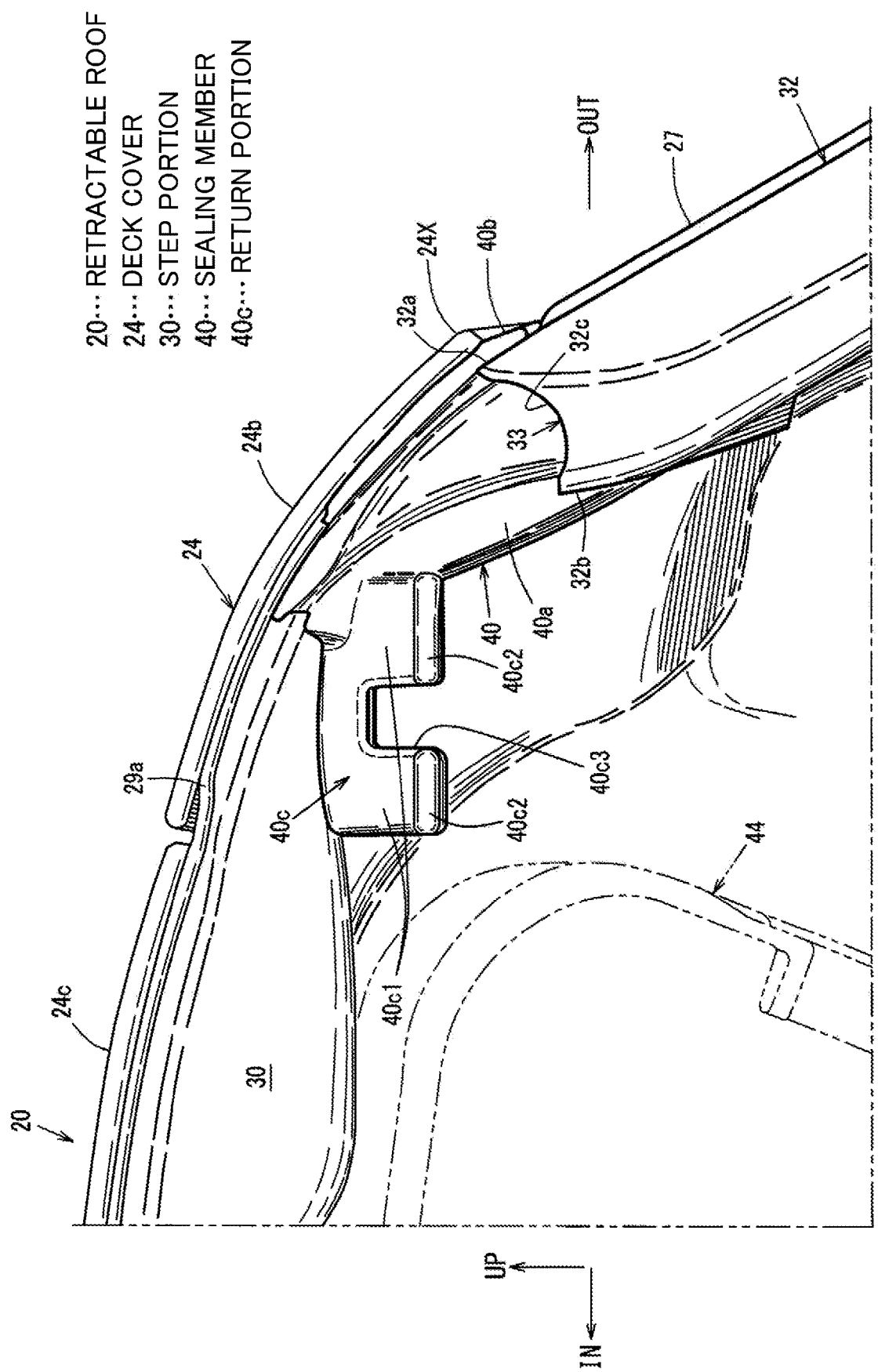

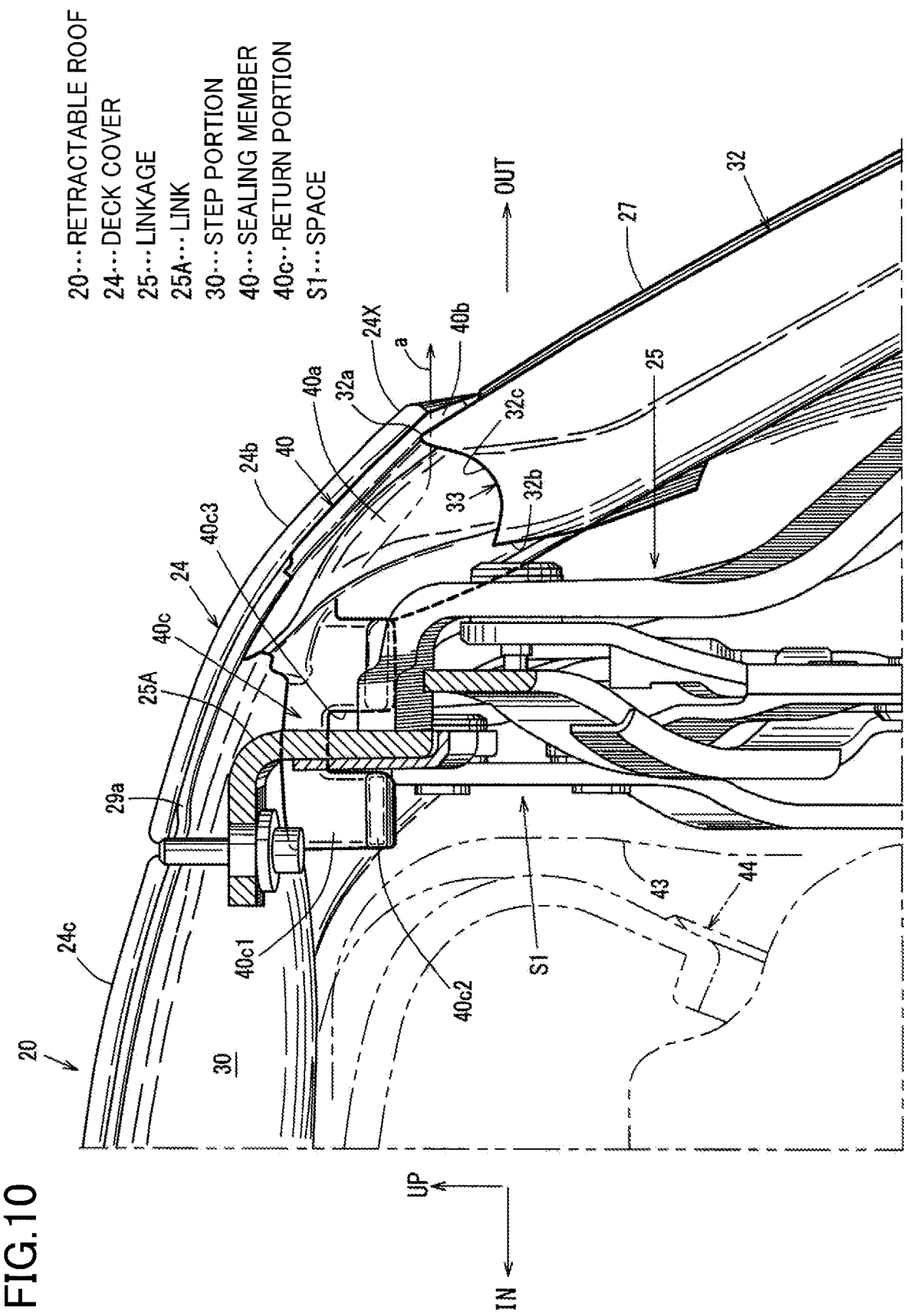

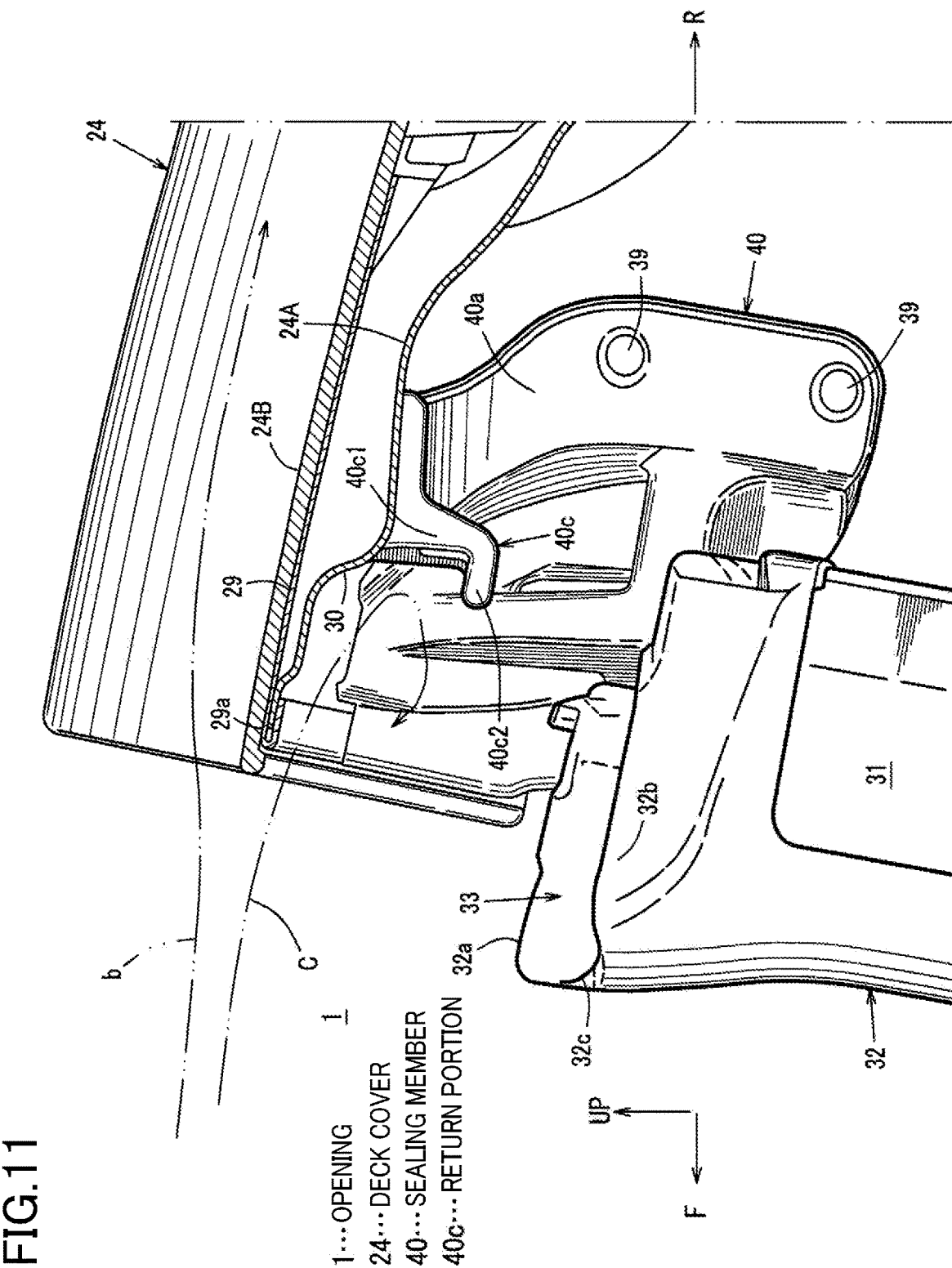

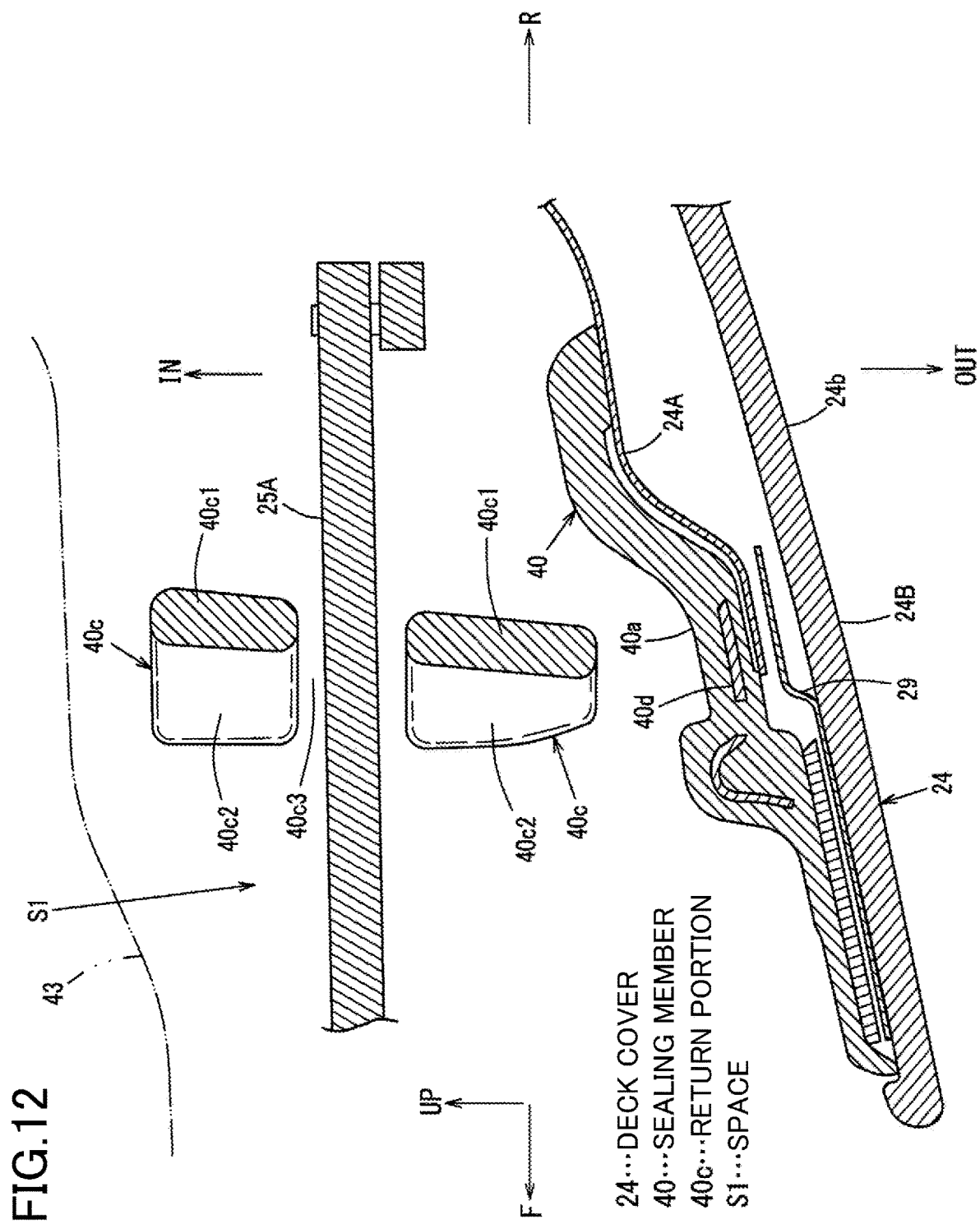

40···SEALING MEMBER
40c···RETURN PORTION

40···SEALING MEMBER
40c···RETURN PORTION

PENETRATING WIND PREVENTION STRUCTURE FOR VEHICLE

TECHNICAL FIELD

The present invention relates to an entering wind prevention structure for a motor vehicle having an opening through an upper or lateral side of a vehicle cabin.

BACKGROUND ART

In general, a convertible including a retractable roof and a motor vehicle including a sunroof have an opening formed through an upper side of the vehicle cabin while the retractable roof or a sunroof panel are open, and other openings formed through lateral sides of the vehicle cabin while side windows are open.

A convertible including a front-side roof that includes a front roof and a middle roof, and a rear-side roof formed as a deck cover is exemplified. In this example, the vehicle cabin has an opening through upper and lateral sides thereof while the front-side roof is open (while the roof is retracted). While the roof is open as described above, travel wind enters front upper corner portions of the deck cover from above the corner portions and from lateral sides of the corner portions. This generates pulsing sound and causes pulsing resonance. In particular, the front upper corner portions of the deck cover are close to passengers' ears. Thus, the passengers feel uncomfortable.

To address this problem, structures disclosed in Patent Documents 1 and 2 have already been devised.

Patent Document 1 discloses a sunroof including a deflector extending forward and downward from a lower surface of the rear edge of the sunroof. Patent Document 2 discloses a sunroof having a step portion protruding forward under a rear edge portion of the sunroof. However, in any of these known structures, the area of the opening that can be blocked by the sunroof is reduced by the deflector and the step portion. Thus, these known structures are susceptible to improvement.

CITATION LIST

Patent Documents

PATENT DOCUMENT 1: Japanese Unexamined Utility Model (Registration) Publication No. S58-60518
PATENT DOCUMENT 2: Japanese Unexamined Patent Publication No. 2001-225646

SUMMARY OF THE INVENTION

Technical Problem

It is therefore an object of the present invention to provide a vehicle entering wind prevention structure that can reduce entry of wind and prevent pulsing sound arising from entering wind, without reducing the opening area of an opening of a vehicle.

Solution to the Problem

An entering wind prevention structure for a motor vehicle according to the present invention is directed to an entering wind prevention structure for a motor vehicle, the motor vehicle having an opening through an upper or lateral side of a vehicle cabin. The structure includes: a return portion extending toward inside of the vehicle cabin and a front of the vehicle from a region spaced rearward from a rear edge of the opening, the return portion returning travel wind toward the front of the vehicle.

According to this configuration, the travel wind that has flowed through the opening into the vehicle cabin is returned to the front of the vehicle at the return portion. Since the travel wind temporarily entering the vehicle cabin is returned, the wind in front of the return portion has its pressure increased. This prevents pulsing sound, and reduces resonance.

Further, since the return portion extends toward the inside of the vehicle and the front of the vehicle from the region spaced rearward from the rear edge of the opening, the opening area of the opening is not reduced.

In short, entry of wind is reduced, and pulsing sound arising from entering wind is prevented, without reducing the opening area of the opening.

In one embodiment of the present invention, the vehicle may include a retractable roof opening and closing the opening, a linkage driving the retractable roof, and a space for link arrangement, and the return portion may be provided to be adjacent to the space for linkage arrangement.

This configuration can more effectively prevent entering wind while preventing the appearance from being impaired and preventing the size of the vehicle cabin from being reduced.

In one embodiment of the present invention, the return portion may be formed in a shape of an inverted "U" when the vehicle is viewed from the front, and may be intended to avoid contact with the link at an intermediate portion of the return portion in a vehicle width direction, while the opening is closed by the retractable roof.

According to this configuration, travel wind that hits the return portion formed in the shape of an inverted "U" is spread by the return portion, thereby preventing generation of pulsing resonances. In addition, part of the travel wind is moderately taken into the vehicle cabin, thereby preserving a sense of openness and achieving both the arrangement of the link for driving the retractable roof and the arrangement of the return portion.

In one embodiment of the present invention, the vehicle may include a front-side roof as the retractable roof and a rear-side roof, and the return portion may include a step portion provided behind a portion of the rear-side roof in contact with the front-side roof to protrude downward, and a return member provided under the step portion.

According to this configuration, since the step portion can be effectively used, the return portion can be formed in a compact manner, and the number of parts is prevented from increasing.

In one embodiment of the present invention, the vehicle may include a front-side roof as the retractable roof and a rear-side roof, a sealing member may be provided on a corner portion of the rear-side roof close to a side window inside the vehicle, and at least one portion of the return portion may extend from the sealing member.

According to this configuration, since the sealing member is effectively used, the number of parts and the number of attachment portions of the vehicle body are prevented from increasing.

In one embodiment of the present invention, a sealing member may be provided on a corner portion of the rear-side roof close to a side window inside the vehicle, and the return member may extend from the sealing member.

Advantages of the Invention

According to the present invention, entry of wind is reduced, and pulsing sound arising from entering wind is prevented, without reducing the opening area of the opening.

BRIEF DESCRIPTION OF THE DRAWINGS

FIG. 5 A partial enlarged side view of FIG. 2.

FIG. 6 A cross-sectional view taken along line A-A shown in FIG. 5.

FIG. 7 A partial enlarged side view of FIG. 1.

FIG. 8 A cross-sectional view taken along line B-B shown in FIG. 7.

FIG. 9 A view viewed along line C-C shown in FIG. 7.

FIG. 10 A view obtained by incorporating a linkage into FIG. 9.

FIG. 11 A side view showing an entering wind prevention structure on the right side of the vehicle.

FIG. 12 A cross-sectional view taken along line E-E shown in FIG. 5.

DESCRIPTION OF EMBODIMENTS

The objective of reducing entry of wind and preventing pulsing sound arising from entering wind, without reducing the opening area of an opening of a vehicle, is attained by the following feature. Specifically, a motor vehicle having an opening through an upper or lateral side of a vehicle cabin is provided with a return portion extending toward inside of the vehicle cabin and a front of the vehicle from a region spaced rearward from a rear edge of the opening, the return portion returning travel wind toward the front of the vehicle.

EMBODIMENT

An embodiment of the present invention will be described with reference to the drawings.

Figure 1:
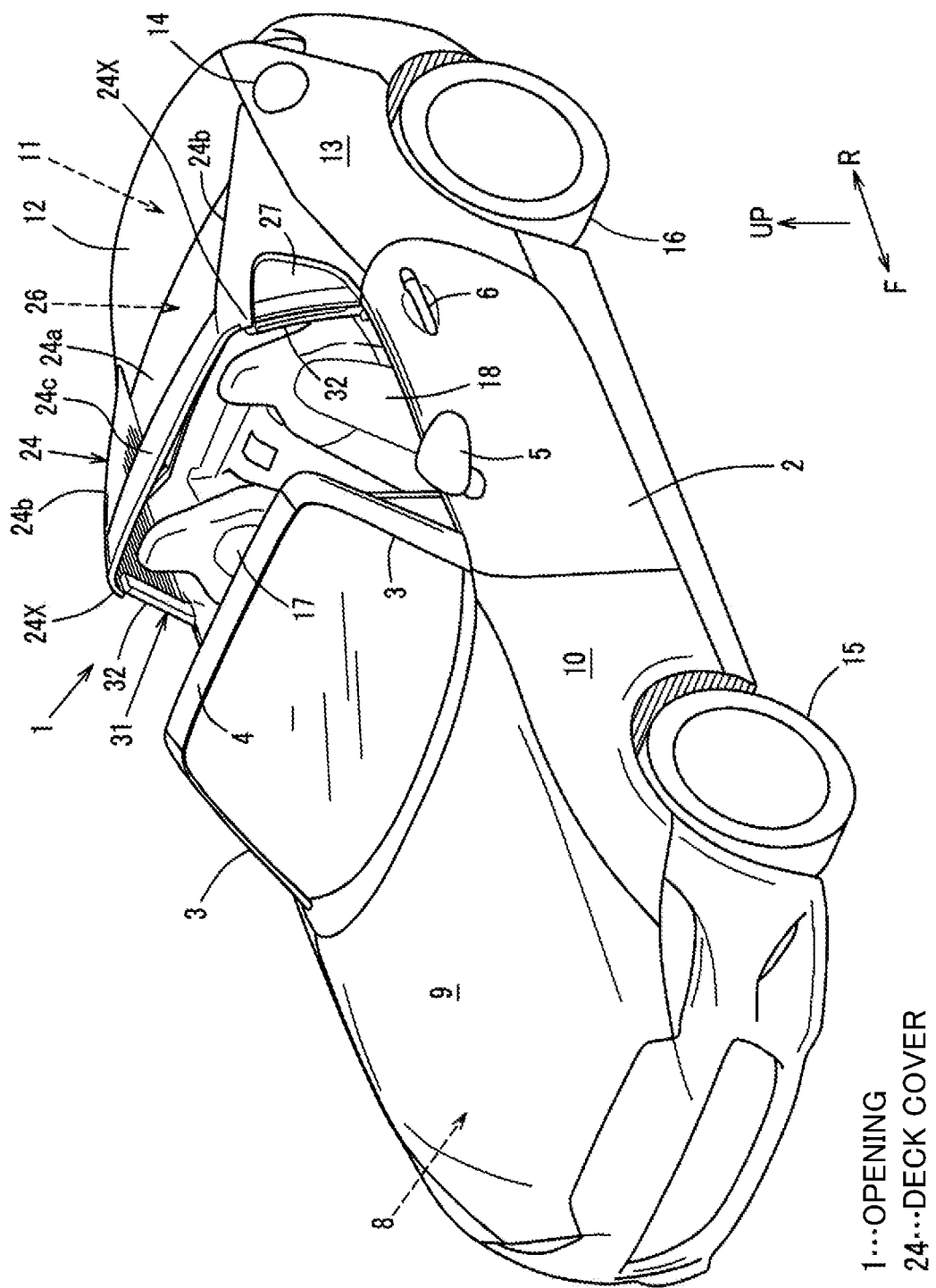
FIG. 1 A perspective view of a motor vehicle with a retractable roof including an entering wind prevention structure according to the present invention with the roof open.
Figure 2:
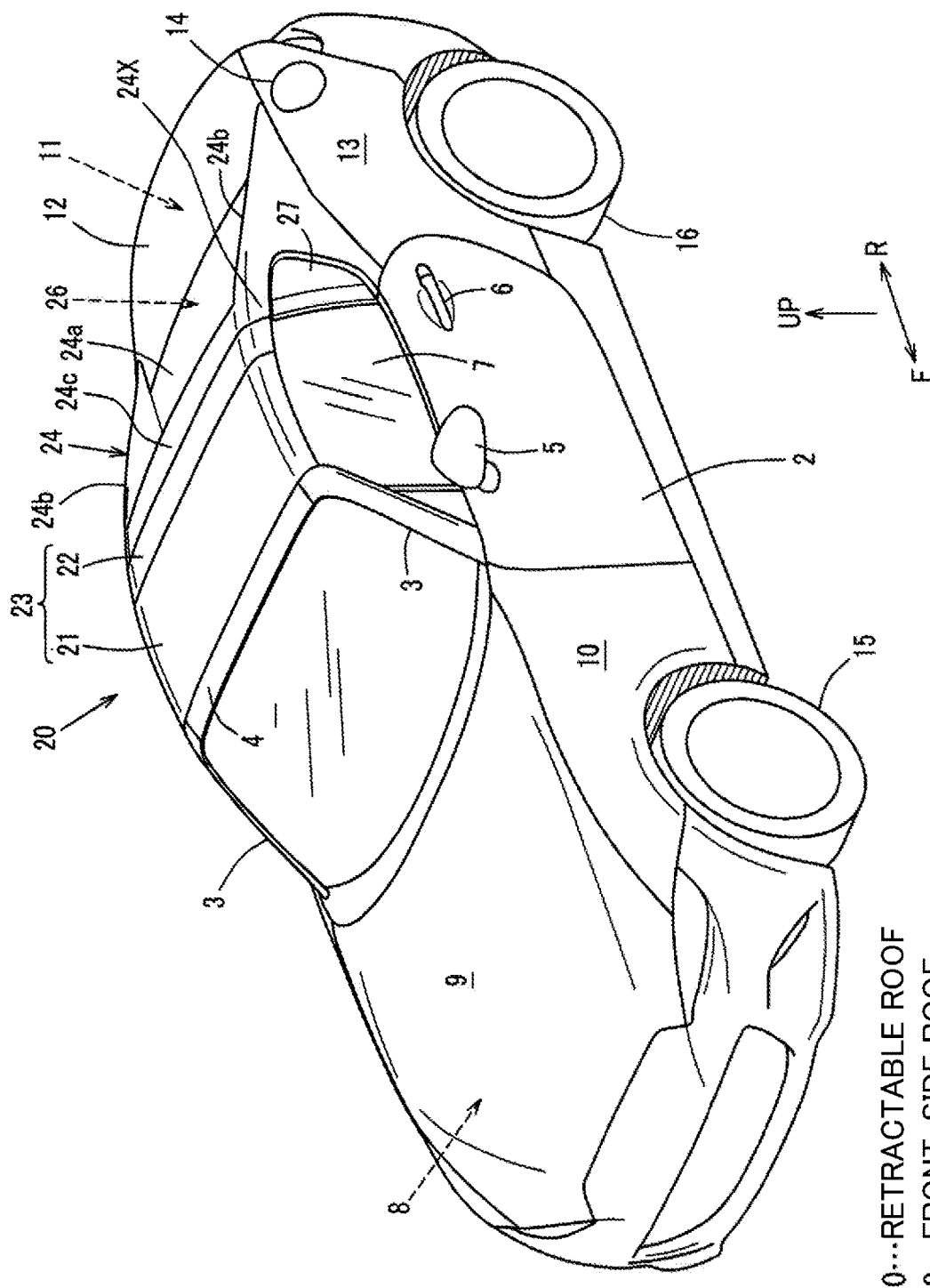
FIG. 2 A perspective view of the motor vehicle with the roof closed.
Figure 3:
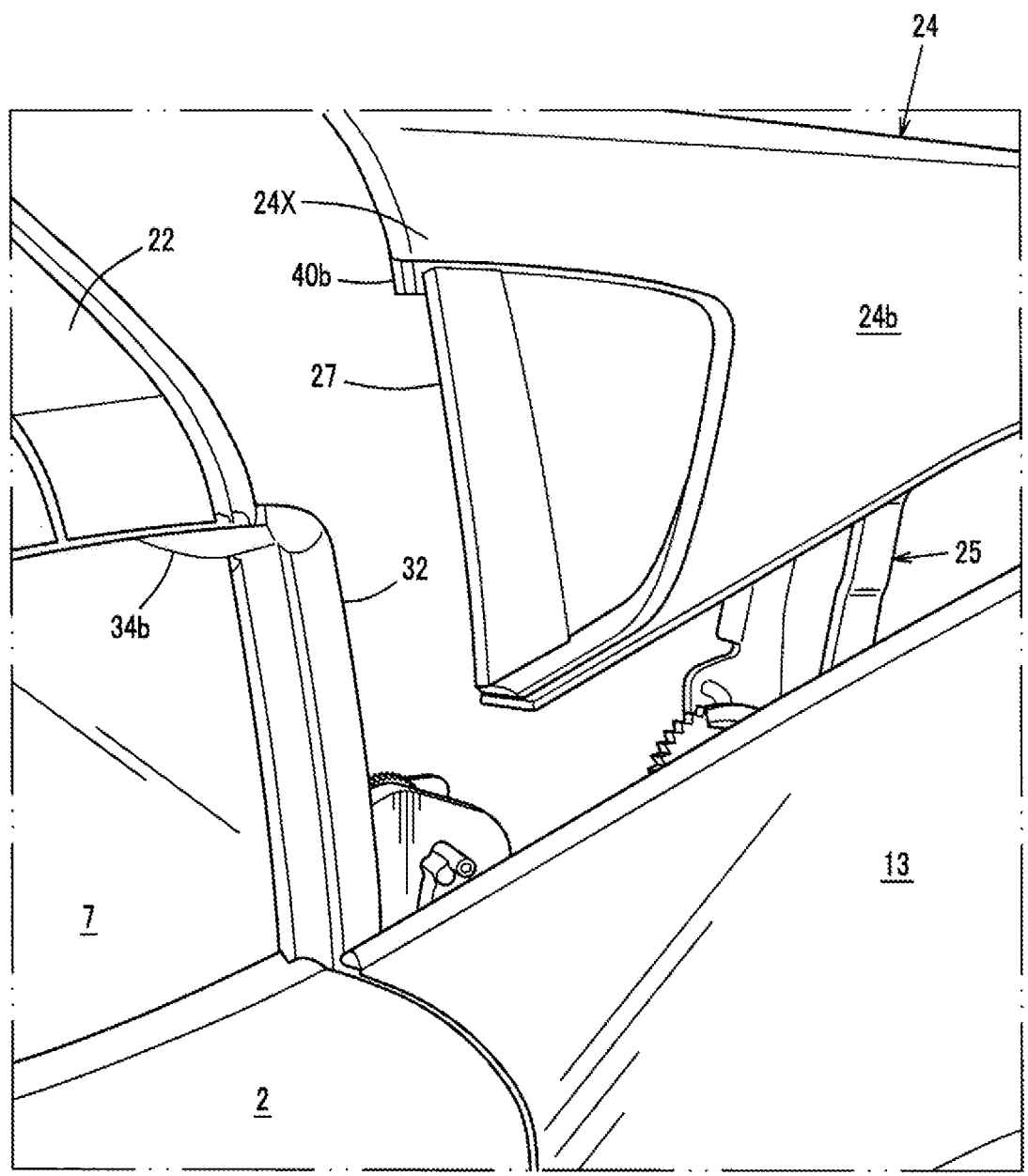
FIG. 3 A perspective view of a region between a side window and an open deck cover and its surroundings.
Figure 4:
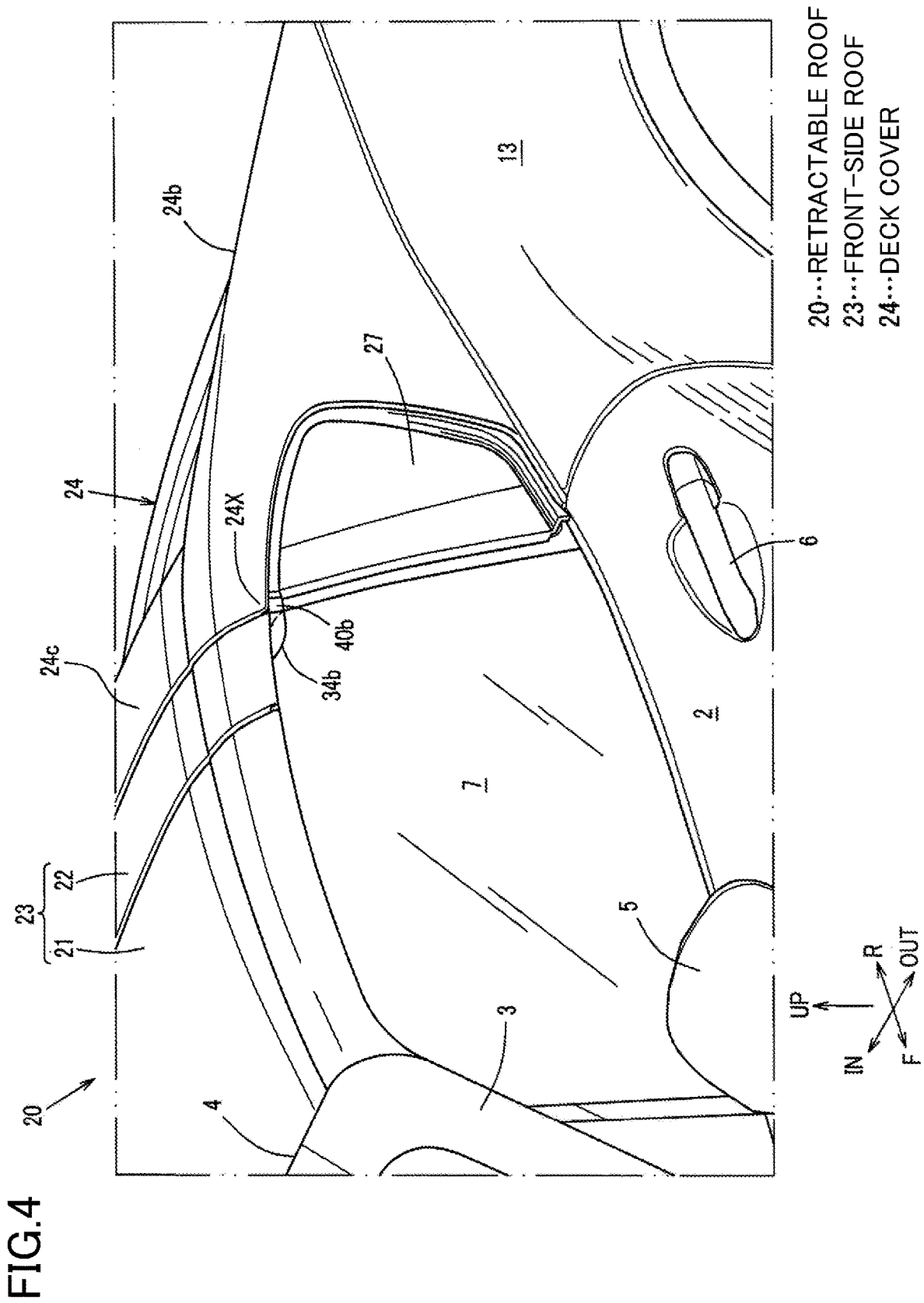
FIG. 4 An enlarged perspective view of an essential portion of FIG. 2.

The drawings illustrate an entering wind prevention structure for a motor vehicle. FIG. 1 is a perspective view of a motor vehicle with a retractable roof including the entering wind prevention structure with the roof open. FIG. 2 is a perspective view of the motor vehicle with the roof closed. FIG. 3 is a perspective view of a region between a side window and an open deck cover and its surroundings. FIG. 4 is an enlarged perspective view of an essential portion of FIG. 2.

As illustrated in FIG. 1, the motor vehicle of this embodiment is a two-seater convertible having an opening 1 through upper and lateral sides of the vehicle cabin.

In FIGS. 1 and 2, front pillars 3 are each provided on an upper end of an associated one of hinge pillars (not shown) that support respective side doors 2. The front pillars 3 each extend upward and rearward from the associated hinge pillar. The right and left front pillars 3 are provided in a pair. A front header 4 extending in the vehicle width direction is provided between upper end portions of the right and left front pillars 3, 3. In this embodiment, the hinge pillars, front pillars 3, and front header 4 described above are all vehicle body strength members.

The side doors 2 each include a door mirror 5 and an outer door handle 6, and are each provided with a side window 7 (see FIG. 2) which can be moved upward and downward by a window regulator (not shown).

An upper portion of an engine compartment 8 in a front portion of the vehicle body is covered with a hood 9 such that the engine compartment 8 can open and close, and the right and left sides of the engine compartment 8 are covered with front fenders 10, respectively. On the other hand, an upper portion of a trunk space 11 in a rear portion of the vehicle body is covered with a trunk lid 12 such that the trunk space 11 can open and close, and the right and left sides of the trunk space 11 are covered with rear fenders 13, respectively.

Note that reference numeral 14 denotes a fuel filler lid provided on one of the rear fenders 13 to feed fuel, reference numeral 15 denotes front wheels, and reference numeral 16 denotes rear wheels. As illustrated in FIG. 1, seats 17, 18 for seating passengers are provided in the vehicle cabin. One of these seats 17, 18 is determined to be a driver's seat, and the other seat is determined to be a passenger's seat.

As illustrated in FIGS. 1 to 4, a front-side roof 23 including a front roof 21 and a middle roof 22 and a deck cover 24 (specifically, a rear deck cover) serving as a rear-side roof form a retractable roof 20. The middle roof 22 has a shorter dimension in the longitudinal direction of the vehicle (longitudinal length) than the front roof 21. The retractable roof 20 including the front-side roof 23 and the deck cover 24 is configured to open and close the upper end of the vehicle cabin.

The retractable roof 20 is opened and closed through a linkage 25 shown in FIG. 3. While the roof is closed, the front roof 21, the middle roof 22, and the deck cover 24 cover the upper end of the vehicle cabin as illustrated in FIG. 2. While the roof is open, the front roof 21 and the middle roof 22 are retracted in a storage compartment 26 provided in a rear portion of the vehicle body as illustrated in FIG. 1. The linkage 25 includes a plurality of links and a link drive motor, and a base portion of the linkage is attached to the vehicle body.

While the roof is closed as described above, the front roof 21 is detachably engaged with a corresponding portion of the front header 4 via a hook (not shown) provided in the middle of the front end of the front roof 21 in the vehicle width direction.

As illustrated in FIGS. 1 to 4, the deck cover 24 forms an outer surface of a portion of the vehicle between the vehicle cabin and the trunk space 11 when closed. The deck cover 24 includes a plate-like base portion 24a, right and left protruding portions 24b, and a substantially arched header portion 24c, which are integrated together. The base portion 24a extends in the vehicle width direction, and blocks the storage compartment 26 from above. The protruding portions 24b are provided on both sides of the base portion 24a in the vehicle width direction to protrude from the base portion 24a to a height, which increases from its front end toward its rear end. The header portion 24c is bridged between the right and left protruding portions 24b and 24b in the vehicle width direction. A garnish 27 (specifically, a rear deck cover garnish) formed as a member separate from the deck cover 24 is attached to an outer side surface of a front end portion of each of the right and left protruding portions 24b through a plurality of clips (not shown).

FIG. 5 is a partially enlarged side view of FIG. 2. FIG. 6 is a cross-sectional view taken along line A-A shown in FIG. 5. FIG. 7 is a partially enlarged side view of FIG. 1. FIG. 8 is a cross-sectional view taken along line B-B shown in FIG. 7. FIG. 9 is a view viewed along line C-C shown in FIG. 7. FIG. 10 is a view obtained by incorporating a linkage into FIG. 9. FIG. 11 is a side view showing an entering wind prevention structure on the right side of the vehicle. FIG. 12 is a cross-sectional view taken along line E-E shown in FIG. 5. A portion (a) of FIG. 13 is a front view of a sealing member forming a return portion, and a portion (b) of FIG. 13 is a right side view of the sealing member.

As illustrated in FIGS. 6, 8, 11, and 12, to form the portions 24a, 24b, and 24c, the deck cover 24 includes a deck cover inner portion 24A, and a deck cover outer portion 24B that is thicker than the deck cover inner portion 24A and is made of a resin. As illustrated in FIGS. 6 and 8, the deck cover inner portion 24A and the deck cover outer portion 24B are connected together through a sealing member 28 and a bracket 29 at a front upper portion of the deck cover 24. In addition, as illustrated in FIG. 11, a front end portion of the deck cover 24 forms a hemmed portion 29a obtained by hemming the bracket 29 and the deck cover inner portion 24A.

As illustrated in FIGS. 9, 10, and 11, the deck cover inner portion 24A is provided with a slanted step portion 30 that is integral therewith. The slanted step portion 30 is provided behind a portion of the deck cover 24 in contact with the middle roof 22, and protrudes downward and rearward.

As illustrated in FIGS. 2 and 4, the side windows 7 are respectively provided in front of the side surfaces of the deck cover 24 as the rear-side roof. As illustrated in FIGS. 4 and 11, corner portions 24X of an upper edge portion of the deck cover 24 close to the associated side windows 7 each protrude toward the front of the vehicle beyond a rear frame portion of the associated side window 7 (a rear portion of a frame of the side window including the associated front pillar 3, the front roof 21, the middle roof 22, and a pillar 31 described below, see the pillar 31 in this embodiment).

As illustrated in FIGS. 1 and 11, the pillars 31 are each disposed on the associated corner portion 24X inside the vehicle. The pillars 31 have a closed cross section, and are provided on the vehicle body to extend in an up-and-down direction. The pillars 31 are each provided with a pillar-side weatherstrip 32. In this embodiment, an extruded member is used as the pillar 31. However, this is merely an example of the present invention.

As illustrated in FIGS. 9 and 10, an upper portion of the pillar-side weatherstrip 32 has a recess 33 extending in the longitudinal direction of the vehicle and defined by an outer piece 32a, an inner piece 32b, and a bottom piece 32c. The recess 33 is configured to receive the retractable roof 20 (specifically, a front-side roof-side weatherstrip 34).

On the other hand, as illustrated in FIGS. 5 and 6, front-side roof-side weatherstrips 34 (specifically, middle roof-side weatherstrips) are each attached to a lower portion of an associated one of outer portions, in the vehicle width direction, of the middle roof 22 as a component of the front-side roof 23. As illustrated in FIG. 5, each front-side roof-side weatherstrip 34 is provided along the lower portion of the middle roof 22. As illustrated in FIG. 6, the front-side roof-side weatherstrip 34 includes inner and outer sealing portions 34a and 34d configured to come into contact with a sealing member 40 so as to achieve sealing, while the roof is closed, and a lip portion 34b positioned to cover the pillar-side weatherstrip 32 on the upper end portion of the pillar 31 and the side window 7 from the outside of the vehicle. Core materials 34c are each provided inside a portion of the front-side roof-side weatherstrip 34 where the core material 34c is needed. Here, the lip portion 34b is formed to extend from the sealing portion 34d toward the front of the vehicle.

As illustrated in FIGS. 10 and 11, the sealing member 40 is attached to the corner portion 24X of the deck cover 24 inside the vehicle, more specifically, the deck cover inner portion 24A corresponding to a front upper portion of the protruding portion 24b, using a plurality of attachment members 39, 39. The sealing member 40 has a portion forming a return portion 40c to be described below.

Figure 13A:
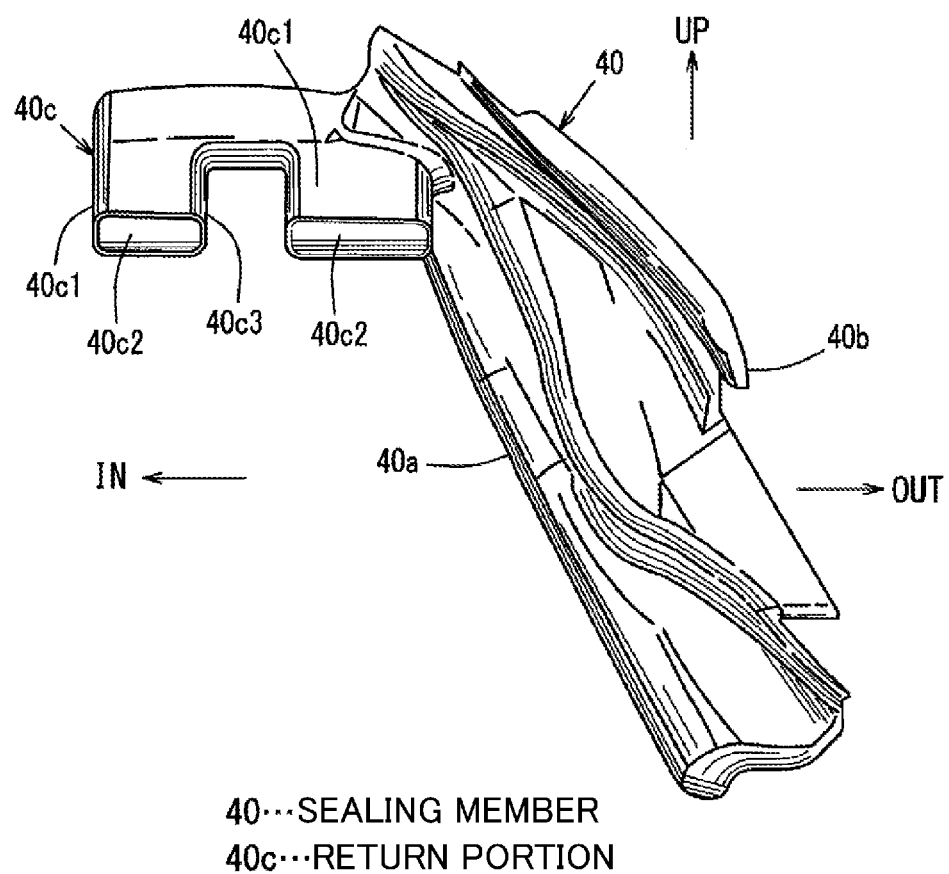
FIG. 13A is a front view of a sealing member.
Figure 13B:
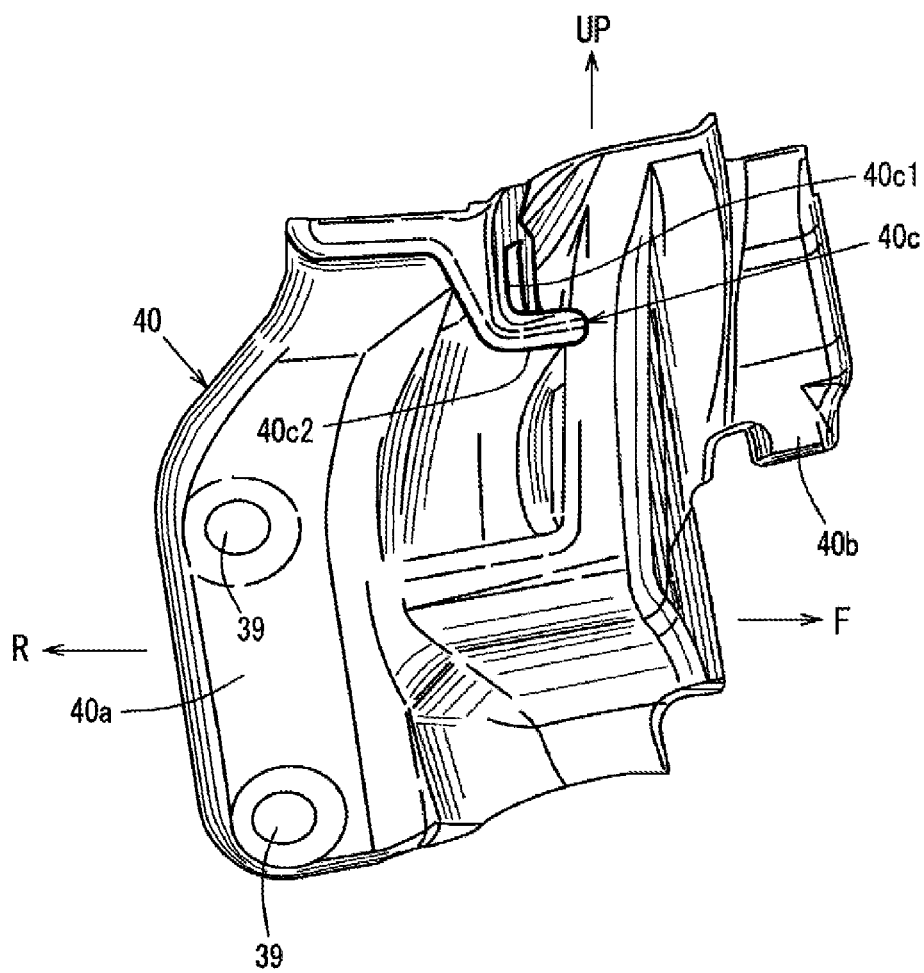
FIG. 13B is a right side view of the sealing member.

As illustrated also in FIGS. 13A and 13B, the sealing member 40 includes a sealing member body 40a, an extended sealing portion 40b, and a return portion 40c. The extended sealing portion 40b extends from an upper portion of the outer surface of the sealing member body 40a in the vehicle width direction while being curved along the shape of the inner surface of the protruding portion 24b of the deck cover 24, and as illustrated in FIG. 8, blocks a major portion of a gap g1 formed between the corner portion 24X and the pillar-side weatherstrip 32 and intended for the lip portion 34b with the front-side roof 23 open (retracted). As illustrated in FIG. 11, the return portion 40c extends toward the interior of the vehicle cabin (in this embodiment, the bottom of the vehicle cabin) from a region spaced rearward from the rear edge of the opening 1 (the front end of the deck cover 24), then extends toward the front of the vehicle, and returns the travel wind toward the front of the vehicle.

As illustrated in FIGS. 6, 8, and 12, core materials 40d are provided inside the sealing member body 40a of the sealing member 40. As illustrated in FIG. 6, while the roof is closed, the extended sealing portion 40b of the sealing member 40 is positioned to sandwich the lip portion 34b of the front-side roof-side weatherstrip 34 between the extended sealing portion 40b and the pillar-side weatherstrip 32.

As shown in FIG. 6, when the side window 7 is moved upward by the window regulator, the pillar-side weatherstrip 32 is located inside the side window 7 in the vehicle width direction, the lip portion 34b comes into contact with an outer surface of the side window 7 in the vehicle width direction, and the extended sealing portion 40b comes into contact with an outer side portion of the lip portion 34b in the vehicle width direction.

As can be seen, the extended sealing portion 40b is provided to block the gap g1 from a portion of the sealing member 40 inside the vehicle, more specifically, to block a major portion of the gap g1 formed between the corner portion 24X and the pillar-side weatherstrip 32 and intended for the lip portion 34b while leaving the other portion of the gap g1 unsealed. This prevents wind suction sound (noise) arising from an air stream flowing along a side surface of the vehicle body. In addition, the extended sealing portion 40b extending from the inside of the vehicle pushes the lip portion 34b during closure of the roof as illustrated in FIG. 6. This helps position the lip portion.

Incidentally, in the absence of the above-described extended sealing portion 40b, as indicated by the phantom arrow a shown in FIG. 10, the air stream flowing along a side surface of the vehicle body causes suction of wind, thus generating suction sound (noise). However, providing the extended sealing portion 40b prevents such suction sound.

Further, as illustrated in FIGS. 5 to 8, a trim strip 42 is provided on the rear frame portion of the side window 7 (see the pillar 31) outside the vehicle, specifically, the upper, rear, and lower edges of the garnish 27. Note that the trim strip 42 is not shown in FIGS. 1 to 4. As illustrated in FIGS. 6 and 8, a front end portion of the trim strip 42 and the rear edge of the extended sealing portion 40b engage with each other while overlapping each other with the front end portion of the trim strip 42 located inside the rear edge of the extended sealing portion 40b.

That is to say, as illustrated in FIGS. 6 and 8, the front end portion of the trim strip 42 is formed in the shape of a hook oriented inward in the vehicle width direction to form a hook-shaped portion 42a, and the rear end of an outer portion of the extended sealing portion 40b in the vehicle width direction is integrated with a locking piece 40e that locks the hook-shaped portion 42a. Engagement between the hook-shaped portion 42a and the locking piece 40e allows the two portions 40b and 42 to engage with each other.

As can be seen, a surface of the extended sealing portion 40b closer to the inside of the vehicle and a surface of the trim strip 42 closer to the outside of the vehicle engage with each other while overlapping each other in the inside-to-outside direction, i.e., the vehicle width direction. This improves the persistence of the positioning accuracy without forming a rigidified structure, such as providing core materials in the extended sealing portion 40b.

As illustrated in FIG. 11, the return portion 40c is provided to extend toward the inside of the vehicle cabin (in this embodiment, the bottom of the vehicle cabin) from a region spaced from the rear edge of the opening 1, i.e., the front edge of the deck cover 24, toward the rear of the vehicle, then extend toward the front of the vehicle, and return the travel wind toward the front of the vehicle. While the roof is open, most of the travel wind flowing from the front of the vehicle toward the rear of the vehicle passes along the outer surface of the deck cover 24, and flows toward the rear of the vehicle as indicated by the phantom arrow b shown in FIG. 11. However, part of the travel wind flows through a corner portion of the deck cover 24 into the deck cover 24 as indicated by the phantom arrow C shown in FIG. 11.

The travel wind that has flowed through the opening 1 into the vehicle cabin (wind entering the vehicle cabin through the corner portion of the deck cover 24) is returned to the front of the vehicle at the return portion 40c. Since the travel wind temporarily entering the vehicle cabin is returned to the front of the vehicle as indicated by the phantom arrow C shown in FIG. 11, the wind in front of the return portion 40c has its pressure increased. This prevents pulsing sound, and reduces resonance.

That is to say, at the corner portion of the deck cover 24 (near the ears of a passenger sitting on an associated seat), part of wind entering the vehicle cabin is returned to the front of the vehicle, thereby reducing entry of additional wind.

Further, the return portion 40c extends toward the inside of the vehicle cabin (in this embodiment, the bottom of the vehicle cabin) from a region spaced from the rear edge of the opening 1 (the front edge of the deck cover 24) toward the rear of the vehicle, and then extends toward the front of the vehicle. This prevents the opening area of the opening 1 from being reduced while the roof is open.

That is to say, entry of wind is reduced, and pulsing sound arising from entering wind is prevented, without reducing the opening area of the opening 1.

As illustrated in FIG. 10, the retractable roof 20 is driven through the linkage 25 to open and close. Both lateral side portions of a space between the retractable roof 20 and the storage compartment 26 in the vehicle width direction each have a space S1 where the linkage 25 is disposed (a linkage arrangement space). FIG. 10 illustrates only a left side portion of the vehicle.

The return portion 40c is provided in a dead space at the upper end of the space S1 to be adjacent to the space S1. This more effectively prevents entering wind without worsening the appearance and reducing the size of the vehicle cabin.

As indicated by the phantom curves shown in FIGS. 10 and 12, an interior material 43 such as a trim is provided to be closer to the inside of the vehicle cabin than the linkage 25 is. The interior material 43 is retracted together with the linkage 25 when the front roof 21 and the middle roof 22 are retracted.

As illustrated in FIGS. 9, 10, 11, and 12, the return portion 40c includes a pair of right and left vertical pieces 40c1 and forward-facing horizontal pieces 40c2. The pair of vertical pieces 40c1 extend from a region spaced rearward of the front edge of the deck cover 24 as the rear edge of the opening 1 toward the inside of the vehicle cabin (in this embodiment, the bottom of the vehicle cabin). The horizontal pieces 40c2 extend from the lower ends of the respective vertical pieces 40c1 toward the front of the vehicle. The return portion 40c has a substantial L-shape as illustrated in FIG. 12 when the vehicle is laterally viewed. The return portion 40c has an inverted U-shape as illustrated in FIG. 10 when the vehicle is viewed from the front.

An opening 40c3 (i.e., an interference preventing opening) is formed between the pair of right and left vertical pieces 40c1 and between the horizontal pieces 40c2. The opening 40c3 avoids contact with one link 25A (see FIGS. 10 and 12) included in the linkage 25 at an intermediate portion of the return portion 40c in the vehicle width direction.

In short, the return portion 40c is formed in the shape of an inverted "U" when the vehicle is viewed from the front. The return portion 40c is intended to, while the opening 1 is closed by the retractable roof 20 (that is, while the roof is closed), avoid contact with one link 25A included in the linkage 25 at the intermediate portion of the return portion 40c in the vehicle width direction. As a result, travel wind that hits the return portion 40c formed in the shape of an inverted "U" when the vehicle is viewed from the front is spread by the return portion 40c, thereby preventing generation of pulsing resonances. In addition, part of the travel wind is moderately taken into the vehicle cabin, thereby preserving a sense of openness and achieving both the arrangement of the linkage 25 and the arrangement of the return portion 40c.

Further, as illustrated in FIG. 11, the return portion 40c includes the slanted step portion 30 provided rearward of the front end of a portion of the deck cover 24 in contact with the middle roof 22, i.e., the upper portion of the deck cover 24, to protrude downward, and a portion of the sealing member 40 provided under the step portion 30 and serving as a return member. Thus, the step portion 30 of the deck cover inner portion 24A is effectively used, and the return portion 40c is thus formed in a compact manner. In addition, effectively using the step portion 30 prevents the number of parts from increasing. In other words, the step portion 30 is effectively used as a portion of the return portion.

Meanwhile, reference numeral 44 shown in FIGS. 9 and 10 denotes a rear window portion, which includes a rear window pane. The rear window portion 44 moves together with the front roof 21 and the middle roof 22, and is retracted in the storage compartment 26 together with the front-side roof 23 when the front-side roof 23 (see FIGS. 2 and 4) is retracted.

Note that in the drawings, the arrow F is directed to the front of the vehicle, the arrow R is directed to the rear of the vehicle, the arrow IN is directed to the inside of the vehicle in the vehicle width direction, the arrow OUT is directed to the outside of the vehicle in the vehicle width direction, and the arrow UP is directed to the upper side of the vehicle.

As can be seen, the vehicle entering wind prevention structure according to this embodiment is intended for a motor vehicle having an opening 1 through an upper or lateral side of the vehicle cabin, and has the return portion 40c extending toward the inside of the vehicle cabin and the front of the vehicle from a region spaced rearward from the rear edge of the opening 1 (see the front edge of the deck cover 24) and returning travel wind toward the front of the vehicle (see FIGS. 1 and 11).

According to this configuration, the travel wind that has flowed through the opening 1 into the vehicle cabin is returned to the front of the vehicle at the return portion 40c. Since the travel wind temporarily entering the vehicle cabin is returned, the wind in front of the return portion 40c has its pressure increased. This prevents pulsing sound, and reduces resonance.

Further, since the return portion 40c extends toward the inside of the vehicle and the front of the vehicle from the region spaced rearward from the rear edge of the opening 1 (see the front edge of the deck cover 24), the opening area of the opening 1 is not reduced.

In short, entry of wind is reduced, and pulsing sound arising from entering wind is prevented, without reducing the opening area of the opening 1.

In one embodiment of the present invention, the retractable roof 20 for opening and closing the opening 1, the linkage 25 for driving the retractable roof 20, and the space S1 for linkage arrangement are provided. The return portion 40c is provided to be adjacent to the space S1 for linkage arrangement (see FIGS. 9 and 12).

This configuration can more effectively prevent entering wind without worsening the appearance and reducing the size of the vehicle cabin.

Furthermore, in one embodiment of the present invention, the return portion 40c is formed in the shape of an inverted "U" when the vehicle is viewed from the front (see FIGS. 9, 10, 12, and 13). The return portion 40c is intended to, while the opening 1 is closed by the retractable roof 20, avoid contact with the link (the linkage 25, in particular, one link 25A included in the linkage 25) at the intermediate portion of the return portion 40c in the vehicle width direction.

According to this configuration, travel wind that hits the return portion 40c formed in the shape of an inverted "U" is spread by the return portion 40c, thereby preventing generation of pulsing resonances. In addition, part of the travel wind is moderately taken into the vehicle cabin, thereby preserving a sense of openness and achieving both the arrangement of the link for driving the retractable roof (see the linkage 25, in particular, the link 25A) and the arrangement of the return portion 40c.

In addition, in one embodiment of the present invention, the retractable roof 20 includes the front-side roof 23 and a rear-side roof (see the deck cover 24), and the return portion 40c includes the step portion 30 behind a portion of the rear-side roof (see the deck cover 24) in contact with the front-side roof 23 to protrude downward, and a return member (see a part of the sealing member 40) provided under the step portion 30 (see FIGS. 2 and 11).

According to this configuration, since the step portion 30 can be effectively used, the return portion 40c can be formed in a compact manner, and the number of parts is prevented from increasing.

In the correspondence between components of the present invention and those of the foregoing embodiment, the linkage of the present invention corresponds to the linkage 25 and the link 25A of the embodiment. Likewise, the rear-side roof corresponds to the deck cover 24, and the return portion corresponds to a portion of the sealing member 40. However, components of the foregoing embodiment are merely examples of the present invention.

For example, in the foregoing embodiment, the convertible is exemplified as a motor vehicle having an opening. However, the convertible may be replaced with a motor vehicle including a sunroof or side windows. In the foregoing embodiment, the return portion 40c that is L-shaped when the vehicle is laterally viewed is exemplified. However, this return portion may be replaced with a return portion curved toward the inside of the vehicle cabin and the front of the vehicle to form an arc shape.

INDUSTRIAL APPLICABILITY

As can be seen from the foregoing description, the present invention is useful for an entering wind prevention structure for a motor vehicle having an opening through an upper or lateral side of the vehicle cabin.

DESCRIPTION OF REFERENCE CHARACTERS

1 . . . Opening
20 . . . Retractable Roof
23 . . . Front-Side Roof
24 . . . Deck Cover (Rear-Side Roof)
25 . . . Linkage
25A . . . Link
30 . . . Step Portion
40 . . . Sealing Member (Return Member)
40c . . . Return Portion
S1 . . . Space (Space for Link Arrangement)

The invention claimed is:

1. An entering wind prevention structure for a motor vehicle, the motor vehicle having an opening through an upper or lateral side of a vehicle cabin, wherein
the vehicle includes a retractable roof opening and closing the opening, a linkage driving the retractable roof, and a space for linkage arrangement,
the structure includes a return portion extending toward inside of the vehicle cabin and a front of the vehicle from a region spaced rearward from a rear edge of the opening, the return portion returning travel wind that has flowed from the opening into a rear of the vehicle cabin with respect to the rear edge of the opening toward the front of the vehicle,
the return portion is provided to be adjacent to the space for link arrangement, and
the return portion is formed in a shape of an inverted "U" when the vehicle is viewed from the front, and is intended to avoid contact with the linkage at an intermediate portion of the return portion in a vehicle width direction while the opening is closed by the retractable roof.

2. An entering wind prevention structure for a motor vehicle, the motor vehicle having an opening through an upper or lateral side of a vehicle cabin, wherein the vehicle includes a retractable roof opening and closing the opening, a linkage driving the retractable roof, and a space for linkage arrangement, the structure includes a return portion extending toward inside of the vehicle cabin and a front of the vehicle from a region spaced rearward from a rear edge of the opening, the return portion returning travel wind toward the front of the vehicle, the return portion is provided to be adjacent to the space for link arrangement, the vehicle includes a front-side roof as the retractable roof and a rear-side roof, and the return portion includes a step portion provided behind a portion of the rear-side roof in contact with the front-side roof to protrude downward, and a return member provided under the step portion.

3. An entering wind prevention structure for a motor vehicle, the motor vehicle having an opening through an upper or lateral side of a vehicle cabin, wherein the vehicle includes a retractable roof opening and closing the opening, a linkage driving the retractable roof, and a space for linkage arrangement, the structure includes a return portion extending toward inside of the vehicle cabin and a front of the vehicle from a region spaced rearward from a rear edge of the opening, the return portion returning travel wind toward the front of the vehicle, the return portion is provided to be adjacent to the space for link arrangement, the vehicle includes a front-side roof as the retractable roof and a rear-side roof, and a sealing member is provided on a corner portion of the rear-side roof close to a side window inside the vehicle, and at least one portion of the return portion extends from the sealing member.

4. The structure of claim 2, wherein a sealing member is provided on a corner portion of the rear-side roof close to a side window inside the vehicle, and the return member extends from the sealing member.

5. The structure of claim 2, wherein the return portion is formed in a shape of an inverted "U" when the vehicle is viewed from the front, and is intended to avoid contact with the linkage at an intermediate portion of the return portion in a vehicle width direction while the opening is closed by the retractable roof.

6. The structure of claim 3, wherein the return portion is formed in a shape of an inverted "U" when the vehicle is viewed from the front, and is intended to avoid contact with the linkage at an intermediate portion of the return portion in a vehicle width direction while the opening is closed by the retractable roof.

7. The structure of claim 5, wherein a sealing member is provided on a corner portion of the rear-side roof close to a side window inside the vehicle, and the return member extends from the sealing member.

* * * * *